United States Patent
Vanover et al.

(10) Patent No.: US 8,205,006 B2
(45) Date of Patent: Jun. 19, 2012

(54) SYSTEMS AND METHODS FOR DISCONTINUOUS MULTI-MEDIA CONTENT TRANSFER AND HANDLING

(75) Inventors: Michael T. Vanover, Raleigh, NC (US); Peter G. Gaucher, Cary, NC (US); James A. Hunt, Chapel Hill, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 155 days.

(21) Appl. No.: 12/571,300

(22) Filed: Sep. 30, 2009

(65) Prior Publication Data
US 2011/0078325 A1   Mar. 31, 2011

(51) Int. Cl.
G06F 15/16   (2006.01)
G06F 12/00   (2006.01)
(52) U.S. Cl. .................................. 709/232; 709/250
(58) Field of Classification Search .......... 709/232–245, 709/250
See application file for complete search history.

(56) References Cited

U.S. PATENT DOCUMENTS

| | | | |
|---|---|---|---|
| 6,694,145 B2 * | 2/2004 | Riikonen et al. | 455/502 |
| 7,260,079 B1 | 8/2007 | Chapman et al. | |
| 7,509,433 B1 * | 3/2009 | Hall et al. | 709/232 |
| 7,656,834 B2 * | 2/2010 | Lee et al. | 370/312 |
| 7,689,510 B2 | 3/2010 | Lamkin et al. | |
| 2005/0190712 A1 * | 9/2005 | Lee et al. | 370/312 |
| 2006/0183550 A1 * | 8/2006 | Gagner et al. | 463/42 |
| 2008/0192820 A1 | 8/2008 | Brooks et al. | |
| 2008/0301146 A1 * | 12/2008 | Vitanov | 707/10 |
| 2009/0092142 A1 * | 4/2009 | Kreiner et al. | 370/401 |
| 2010/0023579 A1 * | 1/2010 | Chapweske et al. | 709/203 |
| 2010/0180044 A1 * | 7/2010 | Olsson et al. | 709/231 |

* cited by examiner

Primary Examiner — Zarni Maung
(74) Attorney, Agent, or Firm — Ference & Associates LLC

(57) ABSTRACT

Embodiments of the invention broadly provide systems, methods and devices for discontinuous multi-media content transfer and handling. Various embodiments of the invention also provide for multi-media content management such that various policies (for example, DRM policies of multi-media content providers) are efficiently adhered to.

20 Claims, 4 Drawing Sheets

ABSTRACT

SYSTEMS AND METHODS FOR DISCONTINUOUS MULTI-MEDIA CONTENT TRANSFER AND HANDLING

The area of multi-media content transfer to mobile computing devices, for example movies downloaded over a WLAN (WiFi) connection to a laptop computer for viewing, has experienced a rapid increase in consumer demand in recent years. This trend is likely to continue given the growing amount of multimedia content available and the increasing amount of mobile devices allowing download of the multi-media content for remote viewing.

Currently there are a variety of content transfer models for download of multi-media content. These models are often, though not always, dictated by DRM (digital rights management) policies of the multi-media content providers. For example, one model allows users to purchase the multimedia content, usually non-DRM (digital rights managed) content, download it, and use it free and clear for an unlimited time and/or with unlimited copying. Another model is a limited (for example, time-limited and/or device limited) multi-media content download model, which expires in some way and/or is limited to a device in some way (usually DRM content). Still another model is a subscription model, wherein a serial payment scheme authorizes a user to engage in serial content download and utilization. Moreover, there is a multi-device model, which entails a somewhat more complicated back end supervision of the multi-media content downloaded, with the supervision commonly providing a device-based limitation on downloaded content use and distribution.

Currently, it has been observed that the vast majority of mobile computing devices (on the order of ninety percent (90%)) are not 3G (third generation) network enabled devices, though the number of mobile computing devices having such an improved mobile network connection (3G) is steadily improving. Thus, there is a relatively low penetration (on the order of ten percent (10%)) in the mobile computing device market of 3G network enabled devices. The market penetration of 3G is expected to grow considerably, however, allowing more and more mobile computing device users to be connected to the Internet at least in a limited way in a wide variety of areas.

Notably, the overwhelming majority (upwards of ninety percent (90%)) of mobile computing device users obtain (download/transfer to the mobile computing device) multi-media content utilizing a WLAN (WiFi) connection (or some other high-speed connection, for example Ethernet/wired), irrespective of cellular WAN (for example 3G) availability. This is due in large part to the relatively large size of the multi-media content and the bandwidth requirements for appropriate content transfer rates. Naturally, multi-media content can be obtained in an alternative form (for example as embedded on a DVD-ROM and physically inserted into the mobile computing device for viewing). However, currently mobile computing device users prefer a multi-media content transfer utilizing a WLAN connection.

BRIEF SUMMARY

Embodiments of the invention broadly provide systems, methods and devices for discontinuous multi-media content transfer and handling. Discontinuous multi-media content transfer is advantageous in at least it provides mobile computing device users having relatively reliable yet limited bandwidth Internet connectivity (a cellular WAN connection, for example via the 3G network) an opportunity to view, select and/or purchase multi-media content, while retaining the ability to utilize a more appropriate network connection (for example, WLAN/WiFi) for the actual multi-media content download/transfer. Various embodiments of the invention also provide for multi-media content management such that various policies (for example, DRM policies of multi-media content providers) do not lead to deleterious or undesirable effects on the mobile computing devices (storing the multi-media content).

In summary, one aspect of the invention provides an apparatus comprising: one or more processors; and one or more computer readable storage mediums having computer program code embodied therewith, the computer program code comprising: computer program code configured to enable the apparatus to utilize a first network connection for selecting multi-media content for download; and computer program code configured to delay download of the multi-media content selected for download until a second network connection is available to the apparatus, the second network connection being more suitable for downloading the multi-media content selected for download than the first network connection.

Another aspect of the invention provides a method comprising: utilizing one or more processors to execute a program of instructions configured to: utilize a first network connection for selecting multi-media content for download; and delay download of the multi-media content selected for download until a second network connection is available, the second network connection being more suitable for downloading the multi-media content selected for download than the first network connection.

A further aspect of the invention a computer program product comprising a computer readable storage medium having computer readable program code embodied therewith, the computer readable program code being configured to: utilize a first network connection for selecting multi-media content for download; and delay download of the multi-media content selected for download until a second network connection is available to the apparatus, the second network connection being more suitable for downloading the multi-media content selected for download than the first network connection.

For a better understanding of embodiments of the present invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
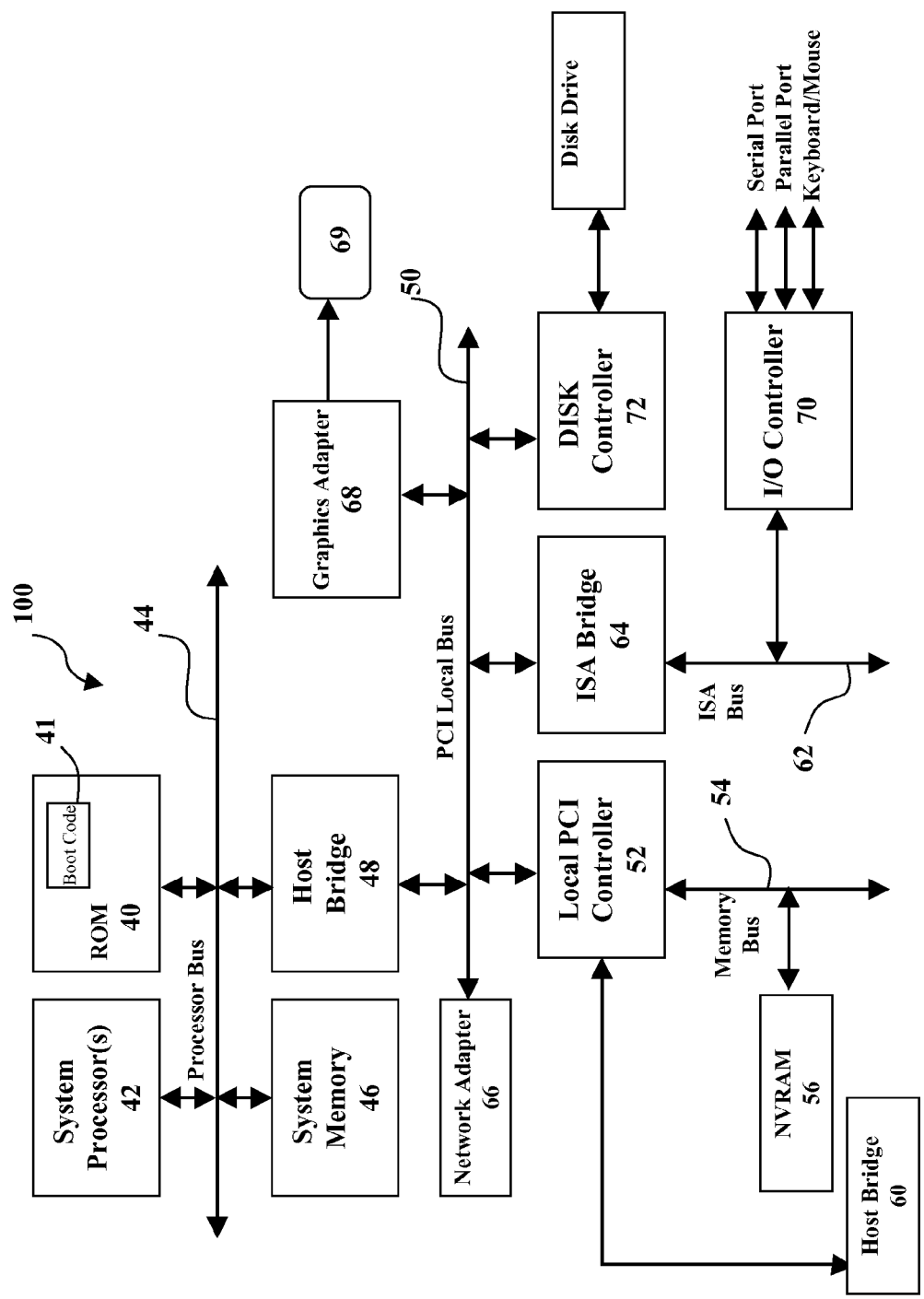
FIG. 1 illustrates an exemplary computer system.

It will be readily understood that the components of the embodiments of the invention, as generally described and illustrated in the figures herein, may be arranged and designed in a wide variety of different configurations in addition to the described presently preferred configurations. Thus, the following more detailed description of the embodiments of the invention, as represented in the figures, is not intended to limit the scope of the claims but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The illustrated embodiments of the invention will be best understood by reference to the figures/drawings. The following description is intended only by way of example, and simply illustrates certain selected presently preferred embodiments of the invention.

Mobile computing devices (for example laptops, smart phones, netbooks and the like) are increasingly popular. A growing number of these devices have reliable Internet connectivity, for example via a cellular WAN such as a 3G network connection. Consumers also have an increasing desire to purchase, download and view multi-media content (for example, full-length feature films) using mobile computing devices.

The inventors have recognized, however, that there are certain drawbacks to current systems, methods and devices for accomplishing mobile multi-media purchase, download and viewing. For example, even though an increasing number of devices have reliable mobile Internet connectivity (for example via the 3G network), these devices are often without Internet connections of suitable bandwidth to permit an enjoyable download and viewing experience. The 3G network is not fast enough to allow streaming or convenient download of large multi-media files (e.g. movies, especially high definition movies), nor would cellular WAN/3G network providers likely have interest in burdening their networks with such content transfers. Thus, users of mobile computing devices can view and select/purchase multi-media content (e.g. view advertisements and short trailers) yet not be enabled to download and view the actual multi-media content (the movie(s)) utilizing a slower connection (for example, the 3G network connection).

The inventors have thus recognized a deficiency in current systems, method and devices inasmuch as there is currently no discontinuous purchase and download process. For example, currently mobile computing device users cannot leverage their 3G network connections for browsing, viewing samples, selecting multi-media content for purchase and actual conducting the actual purchase, while deferring the actual download of the multi-media content for a later time(s) when a more suitable connection (for example a high speed WiFi connection) is available. Thus, the inventors have recognized that current systems, methods and devices do not maximize multi-media content selection and sales opportunities.

Moreover the inventors have recognized that due to DRM policies of many multi-media content providers, certain multi-media purchased will only be valid for a period of time and then become detrimental to the device at least in wasted storage space. After the period of time has expired, the multi-media content becomes useless, as it cannot be accessed on the mobile computing device. However, it is often difficult to identify and remove expired multi-media content from the mobile computing device. Accordingly, a significant amount of storage space is wasted with expired DRM content.

Accordingly, various embodiments of the invention provide for a discontinuous selecting, purchasing and downloading of multi-media content from a remote content provider. Embodiments of the invention also provide systems, methods and products enabling periodic, automatic identification and removal/deletion of expired DRM material.

The description now turns to the figures and certain select and non-limiting presently preferred embodiments of the invention will be described in further detail.

Referring now to FIG. 1, there is depicted a block diagram of an illustrative embodiment of a computer system 100. The illustrative embodiment depicted in FIG. 1 may be an electronic device such as a desktop, laptop, workstation, mobile computer, mobile Internet device, smart phone and the like. As is apparent from the description, however, the embodiments of the invention may be implemented in any appropriately configured electronic device used for mobile multi-media content downloading, as described herein. A presently preferred mobile computing device would have a minimum display screen size of approximately 10 inches and a minimum of 720 progressive (720 p) (for suitable viewing of multi-media content), though other suitable display screen and device sizes may be utilized.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, or an ARM processor, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces electronic device 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, and the like. A disk controller 72 connects a disk drive with PCI local bus 50. The USB Bus and USB Controller (not shown) are part of the Local PCI controller (52).

Figure 2:
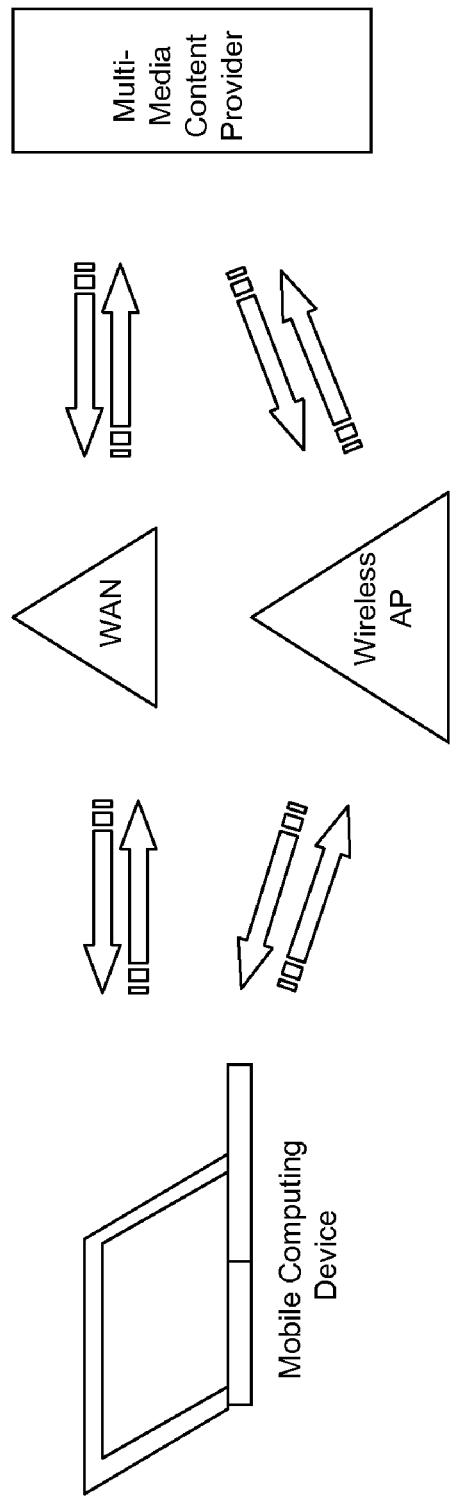
FIG. 2 illustrates a non-limiting and exemplary system for downloading multi-media content.

Referring now to FIG. 2, there is illustrated a non-limiting and exemplary system for downloading multi-media content. As shown, a mobile computing device, for example computer system 100, is configured as a dual radio device. Thus, the mobile computing device is configured to connect to multi-media content providers (as well as other Internet devices/providers) utilizing either a slower yet broadly available network connection (for example, a cellular WAN such as the 3G network) or a faster, more periodically available network connection (for example, via a WiFi hotspot/access point and/or Ethernet connection). As is apparent from the discussion herein, discontinuous selection/purchase and download/transfer leverages the devices' ability to connect via multiple connections.

Figure 3:
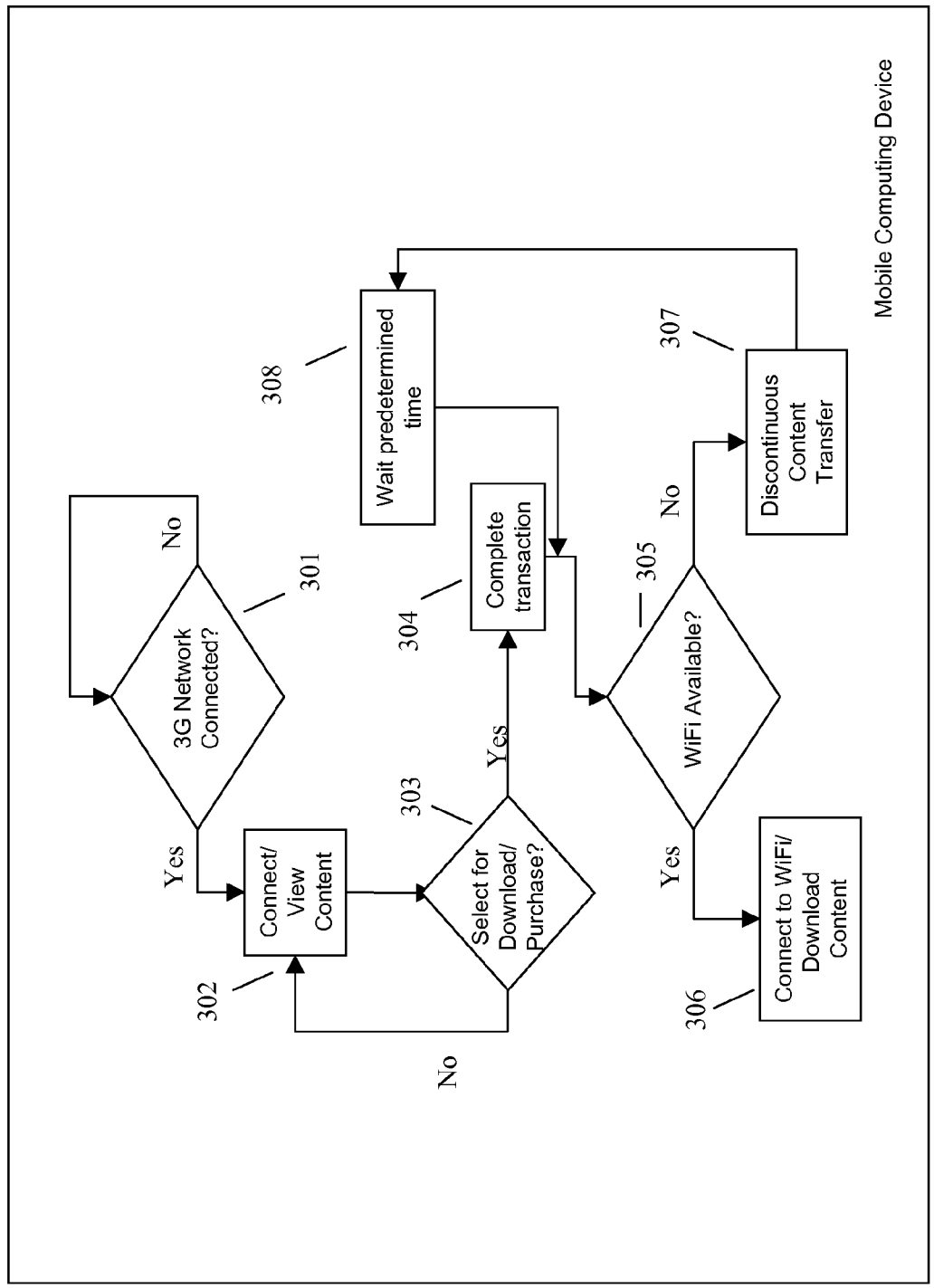
FIG. 3 illustrates a non-limiting and exemplary method for discontinuous multi-media content selection, purchase and download.

Referring now to FIG. 3, there is illustrated a non-limiting and exemplary method for discontinuous multi-media content selection, purchase and download. The processes discussed with regard to FIG. 3-4 may be implemented, for example, utilizing a device such as computer system 100, discussed in connection with FIG. 1 above.

The essentials of discontinuous transfer comprise the general idea that while broadly available network connections (for example 3G) are suitable for limited data transfer, full downloads of large multi-media files (e.g. movies) are better accomplished utilizing another type of connection, for example a WiFi or LAN (Ethernet) connection. Thus, embodiments of the invention provide for discontinuous selection/purchase and transfer/download of multi-media content.

Embodiments of the invention provide a device having a network manager that outputs signals, for example "connected" and "not connected" signals, as appropriate to indicate the mobile computing devices' current connection status. Embodiments of the invention provide a device having a multi-media (movie) manager that accepts signals output from the network manager and utilizes them to coordinate the discontinuous selection/purchase and transfer/download, as discussed herein. A movie gadget (for example utilized with NETFLIX) allows for the user of the device to select the multi-media content for rent/purchase/download from a multi-media content provider. The movie gadget transmits to the multi-media manager the multi-media selections. The multi-media manager then works in communication with the network manager to facilitate discontinuous selection/purchase and download/transfer of the multi-media content, utilizing an appropriate connection to accomplish the appropriate portion of the process.

The exemplary process outlined in FIG. 3 begins at 301 when it is determined if the mobile computing device is connected to a cellular network, such as the 3G network (for example via a network manager). If not, the device may lack Internet connectivity and the process may loop back until a suitable Internet connection is established. However, if at 301 it is determined that the mobile computing device is connected to the 3G network, the user of the mobile computing device will be enabled to connect to the Internet and view limited multimedia content (for example, advertisements, trailers, and the like) at 302. As discussed herein, connections such as the 3G network connection are increasingly popular and suitable for limited functions, for example viewing a small sample clip or advertisement relating to the multi-media content, as well as transmitting purchasing information.

At 303 the user may not find any multi-media content worth purchasing, in which case the user may continue to browse the available/advertised multi-media content. However, at 303 the use may select multi-media content for download. This may indeed include DRM multi-media content purchased from a third party multi-media content provider. Once selected, at 304 the mobile computing device utilizes the existing connection (for example, the 3G network connection) to complete the transaction, which may include a purchase transaction.

At 305 the device determines if a more suitable network connection (for example, a WiFi connection) is available for download (for example, via the network manager). If there is a more suitable connection available to the mobile computing device, this information is transmitted to the multi-media manager and the mobile computing device switches to that connection (for example, the WiFi connection) prior to initiating and/or resuming and completing the download of the multi-media content.

If there is not a more suitable connection available to the mobile computing device at 305, a discontinuous transfer process is initiated at 307 by the multi-media manager. As illustrated, the transaction (for example the selection/purchase) has been completed at 304 using the first network connection (here the 3G connection), thus the user need not reinitiate the transaction/purchase or the download manually when a more suitable connection (WiFi in this example) is available (for example, when the user of the mobile media device connects the device to a WiFi or wired Internet connection upon returning home).

Rather, at 308, the media manager of the mobile computing device waits a predetermined amount of time and again determines when a more suitable connection is established (for example by accepting a "connected" signal from the network manager indicating WiFi connection has been established) for actually downloading (or resuming download of) the multi-media content.

Accordingly, all the mobile computing device user needs to utilize the slower network connection (for example, 3G) to accomplish is the actual selection and/or purchase transaction, which involves a small amount of data transfer. Naturally a purchase transaction involves passing identifying information (for example user specific and/or device specific information) to enable later determination of user/device authorization for download of previously purchased (and/or partially downloaded) multi-media content. A user account is preferably provided, configured to log/track purchased content/download progress such that an interrupted download need not require starting the download over (that is, the download can pick up from where it was left off).

The larger amount of data transfer (the multi-media file download itself) is accomplished upon the mobile computing device establishing a more suitable, higher speed connection (for example, WiFi). This corresponds to a use case scenario where a user of a mobile computing device has somewhat limited Internet connectivity (e.g. via 3G connection) and can view advertisements of multi-media content but would not normally attempt to download and view such content on the current 3G network. Thus, providers of multi-media content have an option to sell the multi-media content while the user first looks it over, deferring actual transfer/download of the content to a later time when the mobile computing device has a more suitable download speed available by virtue of a higher quality Internet connection (for example when the mobile computing device user returns home and connects the mobile computing device to a home WiFi or wired Internet connection). Moreover, the user of the mobile computing device has the opportunity to purchase and queue many multi-media files on the go, deferring download(s) until a better network connection is established.

Figure 4:
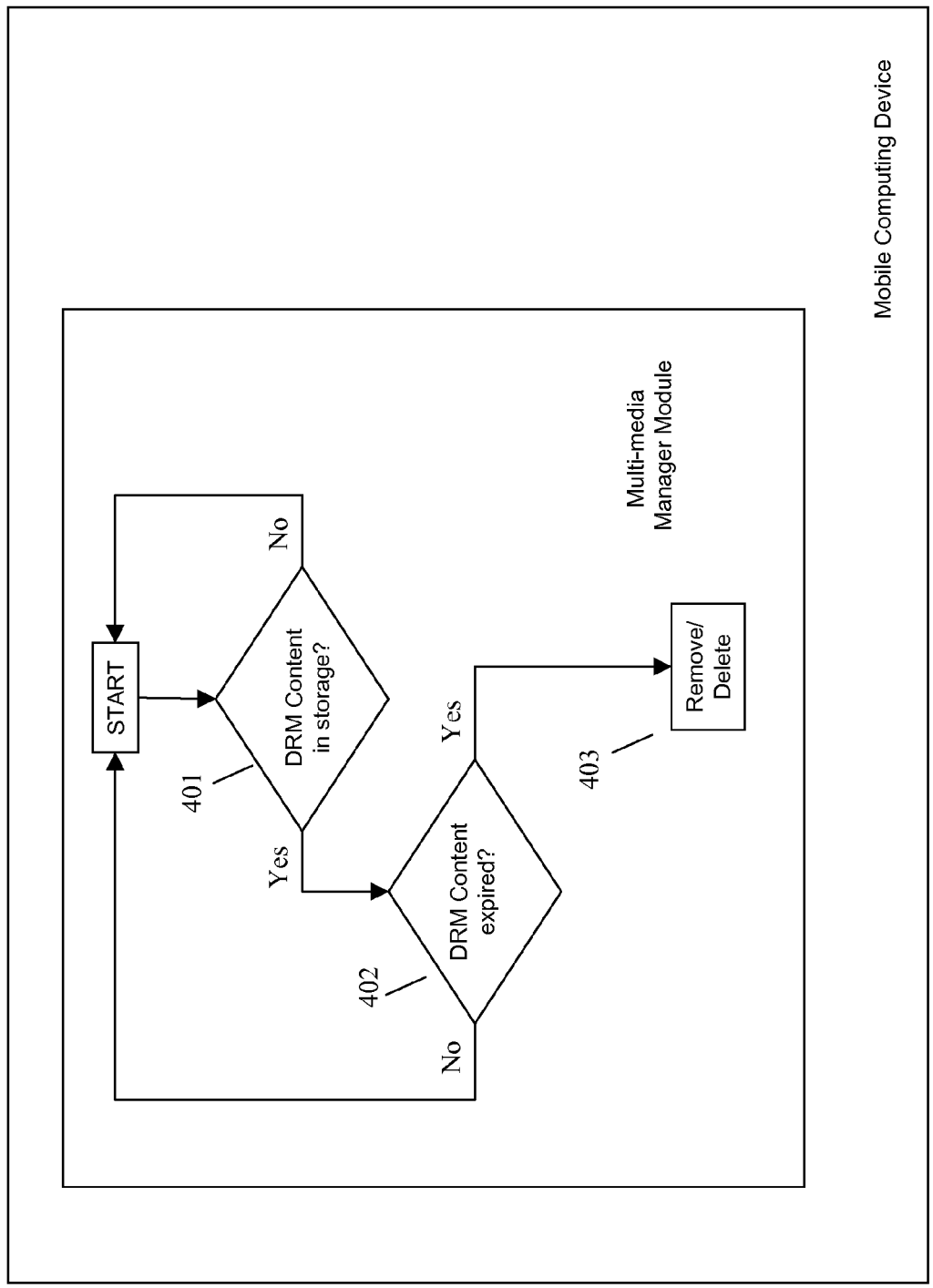
FIG. 4 illustrates a non-limiting and exemplary method for managing multi-media content that has been downloaded to a mobile computing device.

Referring now to FIG. 4, a non-limiting and exemplary method for managing multi-media content that has been downloaded to a mobile computing device is provided. The process begins at 401 when a determination (for example by the multi-media content manager) is made as to whether there is DRM content stored on the mobile computing device. If not, the process may loop back to the start and wait a predetermined amount of time to again make the determination. However, if at 401 it is determined there is DRM managed content stored on the device, at 402 a determination is made as to whether the DRM content has expired.

To determine if the DRM content is expired, it is presently preferred that the multi-media manager module be supplied with the appropriate DRM policies for major content providers such that upon download, the multi-media manager module can label each downloaded multi-media file with an expiration date (and/or expiration after X number of plays or the like) corresponding to the appropriate DRM policy governing the given file. Accordingly, upon expiration, the multi-media manager module can be configured to delete/remove the expired multi-media file.

If at 402 it is determined that the DRM content has expired, the expired DRM content is automatically deleted/removed form storage at 403. This is beneficial in that the expired DRM content is no longer useful to the user of the mobile computing device and will take up an inordinate amount of storage space should it not be removed.

It is presently preferred that the process outlined in FIG. 4 be carried out by a multi-media manager module configured to periodically monitor a given storage area on the mobile computing device selected for or dedicated to the storage of downloaded multi-media content. Accordingly, a smaller amount of storage space can be utilized/dedicated to store downloaded multi-media content, as expired DRM content will be removed from the storage area periodically, allowing newer multi-media content to take its place.

For example, a user may initially select 8 movies for purchase/download on the device utilizing a first network connection (for example a 3G connection). The multi-media manager may await the "connected" signal from the network manager indicating a suitable (for example WiFi or Ethernet) connection is available before initiating/resuming download. The multi-media manager is configurable for a desired performance, for example the dedicated storage for such multi-media downloads could be limited to 6 movie files. Thus the first 6 movies of the 8 movies selected are downloaded by the multi-media manager. Once the user has completed viewing 2 of the movies, the multi-media manager can delete the already watched movies, creating more space in the dedicated storage. It will also be understood by those having ordinary skill in the art that this storage area can be integral to the device or provided as a removable storage device (for example a plug-in "movie stick" with the multi-media manager module embodied thereon) and can be "dedicated" logically or physically.

In brief recapitulation, embodiments of the invention provide for discontinuous purchase and download/transfer of multi-media content, depending on the determined type/quality of network connection. Moreover, embodiments of the invention provide for multi-media content manager configured to periodically clean a storage area storing downloaded multi-media content files.

It should be noted that the description presented herein is non-limiting and exemplary. Thus, although specifics were given regarding certain aspects of the invention (for example connection types, file types, and the like), it will be readily understood that certain modifications can be made by those having ordinary skill in the art without departing from the scope and spirit of the discussed embodiments of the invention.

It will be appreciated by one skilled in the art that aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
    one or more processors; and
    one or more computer readable storage devices having computer program code embodied therewith, the computer program code comprising:
    computer program code configured to enable the apparatus to utilize a first network connection for downloading selection data for selecting multi-media content for download; and
    computer program code configured to delay download of the multi-media content selected for download until a second network connection is available to the apparatus, the second network connection being more suitable for downloading the multi-media content selected for download than the first network connection.

2. The apparatus according to claim 1, wherein the first network connection is a cellular WAN Internet connection.

3. The apparatus according to claim 2, wherein the second network connection is a WiFi Internet connection.

4. The apparatus according to claim 2, wherein the second network connection is a wired Internet connection.

5. The apparatus according to claim 1, wherein selecting multi-media content for download further comprises purchasing the multi-media content selected for download.

6. The apparatus according to claim 5, wherein the computer program code further comprises:
    computer program code configured to determine if purchased multi-media content comprises digital rights managed (DRM) content.

7. The apparatus according to claim 6, wherein the computer program code further comprises:
    computer program code configured to determine if the DRM content has expired.

8. The apparatus according to claim 7, wherein the computer readable program code further comprises:
    computer readable program code configured to delete DRM content determined to have expired.

9. The apparatus according to claim 1, further comprising:
    one or more storage devices;
    wherein the one or more storage devices comprise a dedicated multi-media content storage device.

10. A method comprising:
    utilizing one or more processors to execute a program of instructions stored on one or more computer readable storage devices and configured to:
    utilize a first network connection for downloading selection data for selecting multi-media content for download; and
    delay download of the multi-media content selected for download until a second network connection is available, the second network connection being more suitable for downloading the multi-media content selected for download than the first network connection.

11. The method according to claim 10, wherein the first network connection is a cellular WAN Internet connection.

12. The method according to claim 11, wherein the second network connection is a WiFi Internet connection.

13. The method according to claim 11, wherein the second network connection is a wired Internet connection.

14. The method according to claim 10, wherein selecting multi-media content for download further comprises purchasing the multi-media content selected for download.

15. The method according to claim 14, further comprising:
    utilizing the one or more processors to execute a program of instructions configured to determine if purchased multi-media content comprises digital rights managed (DRM) content.

16. The method according to claim 15, further comprising:
    utilizing the one or more processors to execute a program of instructions configured to determine if the DRM content has expired.

17. The method according to claim 16, further comprising:
    utilizing the one or more processors to execute a program of instructions configured to delete DRM content determined to have expired.

18. The method according to claim 16, further comprising:
    utilizing the one or more processors to execute a program of instructions configured to store multi-media content on a dedicated multi-media content storage device.

19. The method according to claim 10, wherein to delay download of the multi-media content selected for download until a second network connection is available further comprises:
    in response to the second connection being terminated prior to completion of downloading the multi-media content selected for download, reestablishing the second network connection; and resuming downloading the multi-media content selected for download in response to reestablishing the second network connection;

wherein one or more portions of the multi-media content selected for download that were downloaded prior to the second connection being terminated are stored such that the downloading resumes from a point approximating the second connection termination.

20. A computer program product comprising a computer readable storage device having computer readable program code embodied therewith, the computer readable program code being configured to:

utilize a first network connection for downloading selection data for selecting multi-media content for download; and delay download of the multi-media content selected for download until a second network connection is available to the apparatus, the second network connection being more suitable for downloading the multi-media content selected for download than the first network connection.

* * * * *